(12) United States Patent
Karime et al.

(10) Patent No.: US 11,319,494 B2
(45) Date of Patent: May 3, 2022

(54) STEAM QUENCH PERFORMANCE IMPROVEMENT

(71) Applicant: SABIC Global Technologies B.V., Bergen op Zoom (NL)

(72) Inventors: Mustapha N. Karime, Riyadh (SA); Hatem Belfadhel, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 448 days.

(21) Appl. No.: 16/462,749

(22) PCT Filed: Dec. 4, 2017

(86) PCT No.: PCT/IB2017/057622
§ 371 (c)(1),
(2) Date: May 21, 2019

(87) PCT Pub. No.: WO2018/104846
PCT Pub. Date: Jun. 14, 2018

(65) Prior Publication Data
US 2019/0375992 A1    Dec. 12, 2019

Related U.S. Application Data (60) Provisional application No. 62/431,196, filed on Dec. 7, 2016.

(51) Int. Cl.
*C10G 9/16* (2006.01)
*C10G 9/36* (2006.01)
(Continued)

(52) U.S. Cl.
CPC ............ *C10G 9/16* (2013.01); *B01D 17/0211* (2013.01); *B01D 17/0214* (2013.01);
(Continued)

(58) Field of Classification Search
CPC . C10G 9/002; C10G 9/16; C10G 9/36; B01D 17/0208–0214
See application file for complete search history.

(56) References Cited

U.S. PATENT DOCUMENTS

| | | | |
|---|---|---|---|
| 3,688,473 A * | 9/1972 | Brown | C02F 3/28 95/253 |
| 4,037,288 A | 7/1977 | Meyer | |
| 6,214,092 B1 * | 4/2001 | Odom | B01D 19/0042 210/188 |
| 7,560,019 B2 | 7/2009 | McCoy et al. | 208/69 |

(Continued)

FOREIGN PATENT DOCUMENTS

| | | |
|---|---|---|
| CN | 1270206 A | 10/2000 |
| CN | 1401737 A | 3/2003 |

(Continued)

OTHER PUBLICATIONS

International Search Report and Written Opinion from PCT/IB2017/057622 dated Feb. 19, 2018, 10 pages.

*Primary Examiner* — Renee Robinson
(74) *Attorney, Agent, or Firm* — Norton Rose Fulbright US LLP (57) ABSTRACT

Methods that reduce fouling of equipment in a quench water recycling loop of a steam cracker quench system by separating tar from water in the quench water recycling loop. The methods may include settling a bottom stream comprising pyrolysis gasoline, from a quench tower, in at least two quench water settlers in parallel, each of the quench water settlers producing a settler hydrocarbon stream and a settler bottom quench water stream. The methods may also include mixing a bottom stream comprising pyrolysis gasoline, from a quench tower, with quench tower effluent water to form a combined stream. The method may further include settling the combined stream in at least two quench water settlers in parallel to produce settler hydrocarbon streams, settler bottom quench water streams, and settler process water streams.

20 Claims, 7 Drawing Sheets

(51) Int. Cl.
*B01D 17/02* (2006.01)
*B01D 19/00* (2006.01)
*C10G 7/04* (2006.01)
*C10G 9/00* (2006.01)
*C10G 75/00* (2006.01)
*C02F 1/00* (2006.01)
*C02F 101/32* (2006.01)
*C02F 103/36* (2006.01)

(52) U.S. Cl.
CPC ........... *B01D 19/0042* (2013.01); *C10G 7/04* (2013.01); *C10G 9/002* (2013.01); *C10G 9/36* (2013.01); *C10G 75/00* (2013.01); *C02F 2001/007* (2013.01); *C02F 2101/32* (2013.01); *C02F 2103/365* (2013.01); *C10G 2300/4075* (2013.01); *C10G 2400/02* (2013.01)

(56) References Cited

U.S. PATENT DOCUMENTS

| | | | |
|---|---|---|---|
| 7,628,197 B2 * | 12/2009 | Verma | B01D 17/0214 165/60 |
| 7,972,482 B2 | 7/2011 | Strack et al. | 196/134 |
| 7,981,374 B2 | 7/2011 | Strack et al. | 422/201 |
| 8,105,479 B2 | 1/2012 | Ou et al. | 208/44 |
| 8,524,070 B2 | 9/2013 | Strack et al. | 208/106 |
| 2002/0153310 A1 | 10/2002 | Kurukchi et al. | 210/634 |
| 2007/0007172 A1 * | 1/2007 | Strack | C10G 9/00 208/106 |

FOREIGN PATENT DOCUMENTS

| | | | | |
|---|---|---|---|---|
| CN | 101218324 A | | 7/2008 | |
| GB | 2483733 | * | 3/2012 | ......... B01D 17/0211 |
| WO | WO2015086095 A1 | | 6/2015 | |

* cited by examiner

STEAM QUENCH PERFORMANCE IMPROVEMENT

CROSS REFERENCE TO RELATED APPLICATIONS

This application is a national phase application under 35 U.S.C. § 371 of International Application No. PCT/IB2017/057622 filed Dec. 4, 2017, which claims priority to U.S. Provisional Patent Application No. 62/431,196 filed Dec. 7, 2016. The entire contents of each of the above-referenced disclosures is specifically incorporated by reference herein without disclaimer.

FIELD OF INVENTION

The present invention relates to steam cracker quench systems. More specifically, the present invention relates to reducing fouling in, and thereby improving the performance of, steam cracker quench systems.

BACKGROUND OF THE INVENTION

Steam crackers are used to produce certain hydrocarbons, e.g., ethylene, by steam cracking hydrocarbon feedstocks such as naphtha, ethane, and propane. In the steam cracking (pyrolysis) process, the hydrocarbons are superheated in a reactor to temperatures as high as 750-950° C. For the cracking process, a dilution steam generator (DSG) supplies dilution steam to the reactor to reduce the partial pressure of the hydrocarbons. The superheated hydrocarbons are then rapidly cooled (quenched) to stop the reactions after a certain point to optimize cracking product yield. The quenching of the superheated gas in many processes is carried out using water in a quench water tower (QWT). The superheated cracked gas is flowed into the bottom of the quench water tower and, at the same time, water is sprayed into the top of the quench water tower. As the water in the quench water tower falls, it makes contact with the upwardly flowing superheated cracked gas and, in that way, cools the superheated cracked gas and dilution steam.

Because of the direct contact between the superheated cracked gas in the quench water tower and the condensation of the dilution steam, the water flowing from the quench water tower is mixed with condensed hydrocarbons (referred to as pyrolysis gasoline). Pyrolysis gasoline may include components such as aromatics, olefins, and/or diolefins, among others.

To facilitate the separation of the water from the pyrolysis gasoline, the quench water tower effluent stream is flowed from the quench water tower to a quench water settler (QWS). At the quench water settler, the quench water effluent stream is settled and water is drawn off from the quench water settler. Then, the water from the quench water settler is sent to a process water stripper (PWS). The process water stripper strips the water of acid gases and dissolved hydrocarbons. After being stripped in the process water stripper, the water is routed to the DSG (mentioned above). The water that is used to generate dilution steam for the cracking furnaces, and subsequently condensed in the quench water tower, is then circulated to the quench water settler, then to the process water stripper, and finally back to the dilution steam generator is referred to as process water, which circulates in a quench water tower loop. The quench water tower, quench water settler, process water stripper, and dilution steam generator are collectively referred to as the dilution steam system (DSS) or quench system.

Figure 1:
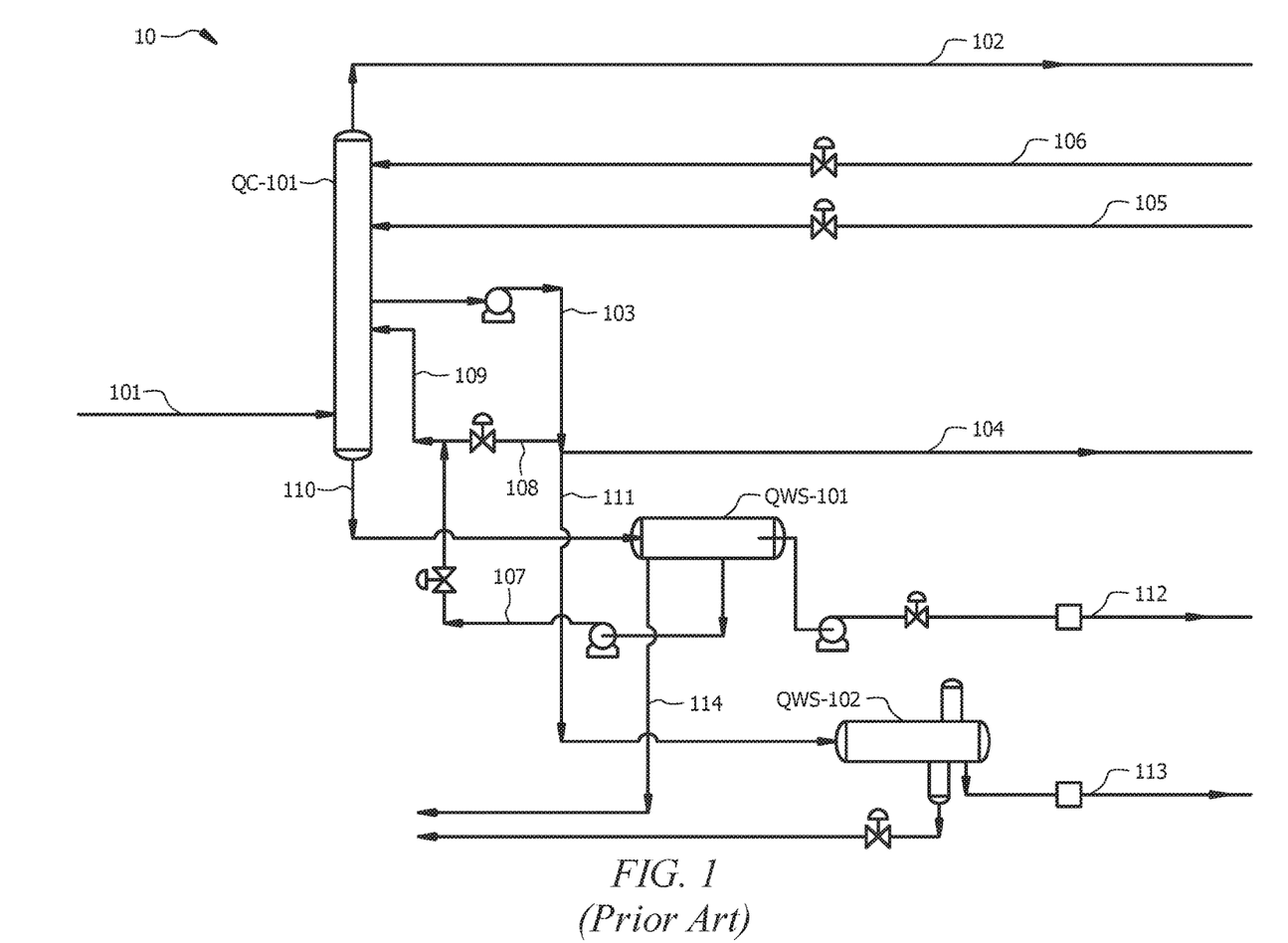
FIG. 1 shows a prior art quench system.

FIG. 1 shows prior art quench system 10. Furnace effluent 101 is fed at the bottom of quench column QC-101. Raw gas stream 102 saturated with water leaves the top of QC-101. Stream 103 comprises hot water and is withdrawn from the quench column chimney tray and split into various streams, namely quench water circulation stream 104, stream 108, and stream 111, as shown in FIG. 1. Quench water circulation stream 104 drives downstream heat exchangers by transferring its heat to these heat exchangers and thus, in this heat transfer, quench water circulation stream 104 is cooled. Quench water circulation stream 104 is fed back to quench column QC-101 as two separate streams, upper quench stream 106 and lower quench stream 105. Stream 111 is fed to quench oil/water settler QWS-102. QWS-102 separates stream 111 into entrained oil and oil-free water. The oil free water is sent to the downstream units as process water stream 113 for further cleaning before it is heated and used as dilution steam in furnace feed. Quench column bottoms stream 110 is fed to quench oil/water settler QWS-101. QWS-101 separates quench column bottoms stream 110 into entrained oil/tar, quench bottom, and pygas. The quench bottom stream 107 is pumped back to quench column QC-101, as part of quench bottom stream 109. Stream 107 and stream 108 are mixed to form quench bottom stream 109, which enters quench column QC-101 just below the quench column chimney tray. Tar is drained from quench oil/water settler QWS-101 as stream 114. Pygas stream 112 is sent to downstream benzene extraction unit.

Fouling occurs in equipment of quench system 10. Tar in quench water circulation stream 104 deposits and builds-up inside downstream heat exchanger tubes. Fouling in quench systems, such as quench system 10, is exacerbated when the feedstock to the steam cracker includes large amounts of propane. When the propane content of the steam cracker feedstock is high, the rate of production of heavy hydrocarbons and tar-like material increases, which can result in plugging and fouling of the quench water system heat exchangers. When heat exchangers are fouled, the quench water's return temperature increases, which can lead to an increase in quench column overhead temperature, fouling of the cracked gas compressor first stage intercooler, and increase in cracked gas compressor suction pressure. Fouling in equipment of the quench system can lead to poor energy efficiency, low production rates, and, in a worst case scenario, to a plant shutdown for cleaning, if excessive fouling sufficiently restricts flow of process water in the quench system.

BRIEF SUMMARY OF THE INVENTION

Systems and methods of the present invention have been discovered that reduce or limit the occurrence of fouling in steam cracker quench systems. The systems and methods are premised on the theory that the likely source of tar-like fouling material, present in a quench water circulation stream flowing from a quench water tower (quench column) to drive downstream heat exchangers or quench water users, may originate from the stream flowing from quench oil/water settlers, which feeds into the quench bottom stream. It is further theorized that the tar in the quench bottom stream may be entrained in the rising furnace effluent gas stream into the chimney tray of the quench column and gets into the quench water circulation stream, which eventually cause equipment fouling. In view of these theories, quench water loop designs are proposed that allow for a sufficiently long residence time in the quench oil/water settlers to improve oil/water separation and eliminate or at least minimize tar-like fouling material in the stream from the quench oil/water settlers that are routed back to the quench water tower as quench bottom stream.

Embodiments of the invention include a method of reducing fouling of equipment in a quench water recycling loop of a steam cracker quench system by separating tar from water in the quench water recycling loop. The method includes receiving furnace effluent in a quench tower and quenching the furnace effluent in the quench tower with quench water to produce (1) a bottom stream comprising pyrolysis gasoline, (2) quench tower effluent water, and (3) a gas stream. The method also includes settling the bottom stream comprising pyrolysis gasoline in at least two quench water settlers in parallel, each of the quench water settlers producing a settler hydrocarbon stream, a settler bottom quench water stream, and tar stream. The method further includes feeding the quench tower effluent water to a water stripper for separation into a stripper hydrocarbon stream and a stripper water stream. The method also includes recirculating the settler bottom quench water streams and the stripper water stream to the quench tower.

Embodiments of the invention include a method of reducing fouling of equipment in a quench water recycling loop of a steam cracker quench system by separating tar from water in the quench water recycling loop. The method includes receiving furnace effluent in a quench tower and quenching the furnace effluent in the quench tower with quench water to produce (1) a bottom stream comprising pyrolysis gasoline, (2) quench tower effluent water, and (3) a gas stream. The method also includes mixing the bottom stream comprising pyrolysis gasoline and the quench tower effluent water to form a combined stream. The method further includes settling the combined stream in at least two quench water settlers in parallel to produce settler hydrocarbon streams, settler bottom quench water streams, and settler process water streams. The method also includes recirculating the settler bottom quench water streams to the quench tower.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc. disclosed throughout the specification.

In the context of the present invention, twenty embodiments are now described. Embodiment 1 is a method of reducing fouling of equipment in a quench water recycling loop of a steam cracker quench system by separating tar from water in the quench water recycling loop. The method includes the steps of receiving furnace effluent in a quench tower; quenching the furnace effluent in the quench tower with quench water to produce (1) a bottom stream containing pyrolysis gasoline, (2) quench tower effluent water, and (3) a gas stream; settling the bottom stream containing pyrolysis gasoline in at least two quench water settlers in parallel, each of the quench water settlers producing a settler hydrocarbon stream and a settler bottom quench water stream; and feeding the quench tower effluent water to a water stripper for separation into a stripper hydrocarbon stream, a stripper water stream, and a tar/oil stream; and recirculating the settler bottom quench water streams and the stripper water stream to the quench tower. Embodiment 2 is the method of embodiment 1 wherein the at least two quench water settlers each include a tar drainage compartment baffle, the ratio of an internal diameter of the settler to the height of the tar drainage compartment baffle is 4.0/3.4 to 4.0/3.2; one or more outlets, for draining tar, located between the tar drainage compartment baffle and a corner of the settler that is closest to a feed inlet nozzle; a bottom quench middle compartment baffle, the ratio of the internal diameter of the settler to the height of the bottom quench middle compartment baffle is 4.0/3.8 to 4.0/3.6; an outlet, for removing settler water, located between the tar drainage compartment baffle and the bottom quench middle compartment baffle; and an outlet, for removing pyrolysis gas, located between the bottom quench middle compartment baffle and a corner of the respective quench water settler located closest to the outlet for pyrolysis gas. Embodiment 3 is the method of embodiment 2 wherein the tar drainage compartment baffle is located at distance "x" from a corner of the respective quench water settler that is closest to a feed inlet nozzle, wherein ratio of the length of the respective quench water settler to "x" is 16.0/10.5 to 16.0/9.5. Embodiment 4 is the method of embodiment 2 the bottom quench middle compartment baffle is located at distance "z" from a corner of the respective quench water settler that is closest to a pyrolysis gas outlet nozzle, wherein ratio of the length of the quench water settler to "z" is 16.0/1.2 to 16.0/0.8. Embodiment 5 is the method of any of embodiments 1 to 4, wherein the at least two quench settlers include a horizontal cylindrical tank. Embodiment 6 is the method of any of embodiments 1 to 5 wherein the settling the bottom stream contains splitting the bottom stream in a first stream and a second stream such that mass flow of first stream/mass flow of second stream is in the range of 40/60 to 60/40. Embodiment 7 is the method of embodiments 1 to 6 further including the step of capturing tar material by a tray located immediately above a bottom quench distributor in the quench tower. Embodiment 8 is the method of any of embodiments 1 to 7 wherein a residence time of material in the at least two settlers is in the range of 20 to 30 minutes. Embodiment 9 is the method of any of embodiments 1 to 8 wherein the settler bottom quench water containing tar that contains C9 hydrocarbons and heavier and the quench tower effluent water containing tar that contains C9 hydrocarbons and heavier. Embodiment 10 is the method of any of embodiments 1 to 9, wherein the at least two quench water settlers include a horizontal capsule tank and corners of the horizontal capsule tank are where a cylindrical section meets the spherical section. Embodiment 11 is a method of reducing fouling of equipment in a quench water recycling loop of a steam cracker quench system by separating tar from water in the quench water recycling loop, the method including receiving furnace effluent in a quench tower; quenching the furnace effluent in the quench tower with quench water to produce (1) a bottom stream containing pyrolysis gasoline, (2) quench tower effluent water, and (3) a gas stream; mixing the bottom stream containing pyrolysis gasoline and the quench tower effluent water to form a combined stream; settling the combined stream in at least two quench water settlers in parallel to produce settler hydrocarbon streams, settler bottom quench water streams, settler process water streams, and tar/oil streams; and recirculating the settler bottom quench water streams to the quench tower. Embodiment 12 is the method of embodiment 11, wherein the at least two quench water settlers includes three partition baffles disposed in the settler so that the settler contains four compartments, the ratio of the internal diameter of the settler to the height of the three partition baffles being 4.3/4.0 to 4.3/3.6. Embodiment 13 is the method of embodiment 12, wherein the four compartments being a feed calming compartment, a bottom quench/tar drainage compartment, a process water compartment, and a pyrolysis gas compartment, wherein the at least two quench water settlers further includes a plurality of drainage outlets leading from the bottom quench/tar drainage compartment for draining tar; a bottom quench outlet leading from the bottom quench/tar drainage compartment for removing settler water; a drainage outlet leading from the feed calming compartment for draining tar; a drainage outlet leading from the process water compartment for draining tar; an outlet leading from the process water compartment for removing settler water; an outlet leading from the pyrolysis gas compartment for removing pyrolysis gas.

Embodiment 14 is method of reducing fouling of equipment in a quench water recycling loop of a steam cracker quench system by separating tar from water in the quench water recycling loop, the method including receiving furnace effluent in a quench tower; quenching the furnace effluent in the quench tower with quench water to produce (1) a bottom stream containing pyrolysis gasoline, (2) quench tower effluent water, and (3) a gas stream; mixing the bottom stream containing pyrolysis gasoline and the quench tower effluent water to form a combined stream; settling the combined stream in at least two quench water settlers in parallel to produce settler hydrocarbon streams, settler bottom quench water streams, settler process water streams, and tar/oil streams, the at least two quench water settlers each including three partition baffles disposed in the settler so that the settler includes four compartments, the ratio of the internal diameter of the settler to the height of the three partition baffles being 4.3/4.0 to 4.3/3.6; and recirculating the settler bottom quench water streams to the quench tower. Embodiment 15 is the method of embodiment 14, wherein the four compartments include a feed calming compartment, a bottom quench/tar drainage compartment, a process water compartment, and a pyrolysis gas compartment, and the at least two quench water settlers each further including a plurality of drainage outlets leading from the bottom quench/tar drainage compartment for draining tar; a bottom quench outlet leading from the bottom quench/tar drainage compartment for removing settler water; a drainage outlet leading from the feed calming compartment for draining tar; a drainage outlet leading from the process water compartment for draining tar; an outlet leading from the process water compartment for removing settler water; an outlet leading from the pyrolysis gas compartment for removing pyrolysis gas; and recirculating the settler water streams to the quench tower. Embodiment 16 is the method of any of embodiments 11 to 15, wherein the at least two quench settlers include a horizontal cylindrical tank. Embodiment 17 is the method of any of embodiments 11 to 16 wherein the settling the combined stream includes the step of splitting the combined stream in a first stream and a second stream such that mass flow of first stream/mass flow of second stream is in the range of 40/60 to 60/40. Embodiment 18 is the method of any of embodiments 11 to 17 further including the step of capturing tar material by a tray located immediately above a bottom quench distributor in the quench tower. Embodiment 19 is the method of any of embodiments 11 to 18 wherein a residence time of material in the at least two settlers is in the range of 20 to 30 minutes. Embodiment 20 is the method of any of embodiments 11 to 19 wherein the settler bottom quench water contains tar that contains C9 hydrocarbons and heavier and the quench tower effluent water contains tar that contains C9 hydrocarbons and heavier.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Systems and methods have been discovered that reduce or limit the occurrence of fouling in a steam cracker quench system. The discovered systems and methods allow for a sufficiently long residence time in quench oil/water settlers and thereby improves oil/water separation and eliminates or at least minimizes tar-like fouling material in the stream from the quench oil/water settlers that are routed back to the quench water column as quench bottom stream.

Figure 2:
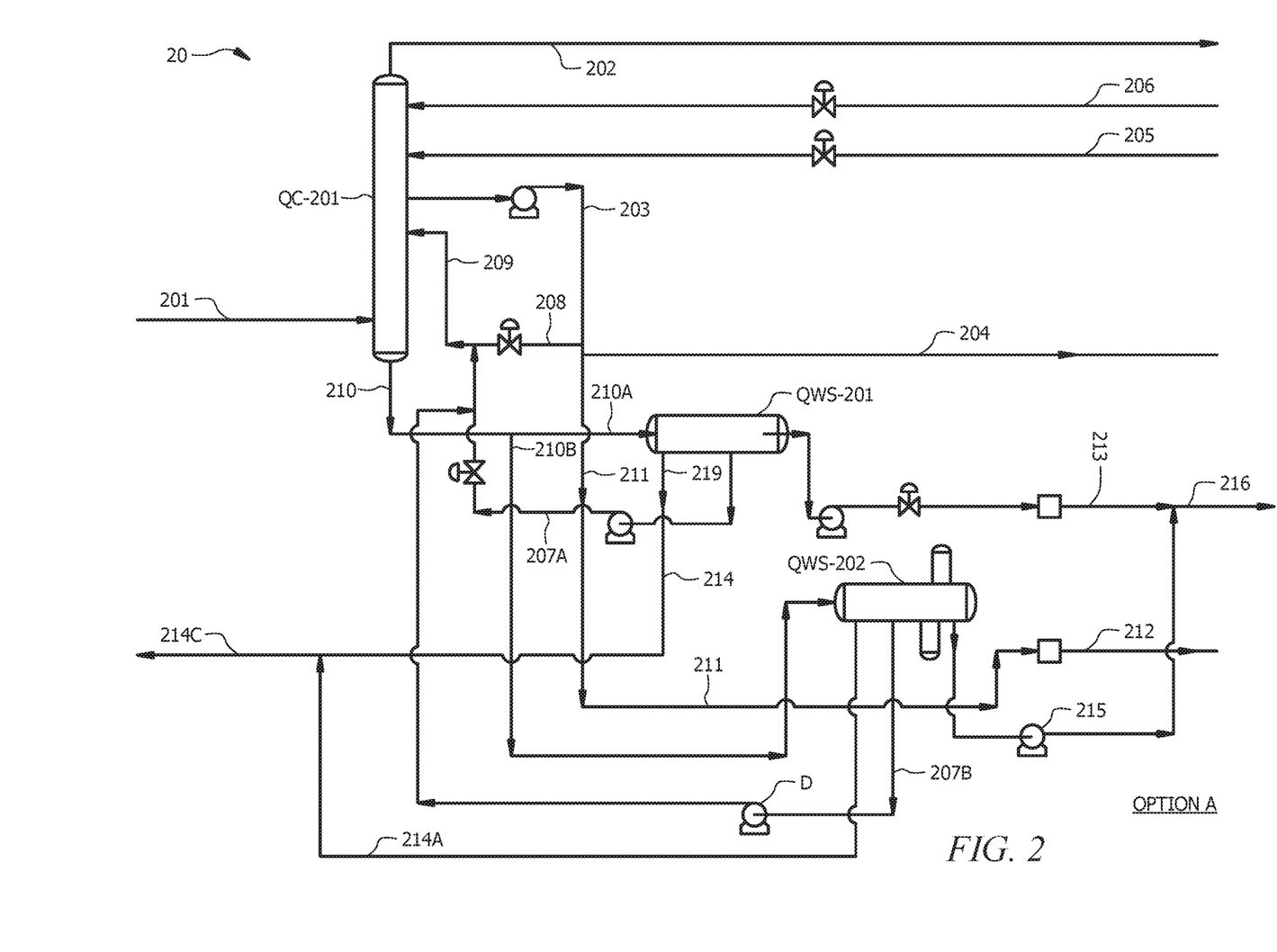
FIG. 2 shows a quench system designed to reduce fouling of equipment in the quench system, according to embodiments of the invention.

FIG. 2 shows system 20 relating to a quench water tower loop, according to embodiments of the invention. Furnace effluent 201 is fed at the bottom of the quench column QC-201. In quench column QC-201, furnace effluent 201 is scrubbed with circulating water to quench it and stop additional thermal side reactions which would cause loss in selectivity to light olefin ($C_2$ to $C_4$ olefins, preferably ethylene and/or propylene) products. Raw gas stream 202, which may be saturated with water, leaves the top of quench column QC-201 and may be fed to a cracked gas compressor (CGC), after which there may be further processing/separation in downstream units. Stream 203 may comprise hot water and may be withdrawn from the quench column chimney tray and split into various streams, namely quench water circulation stream 204, stream 208, and stream 211, as shown in FIG. 2. Quench water circulation stream 204 may drive downstream heat exchangers by transferring its heat to these heat exchangers and thus, in the heat transfer process, quench water circulation stream 204 is cooled. Quench water circulation stream 204 may be fed back to quench column QC-201 as two separate streams, upper quench stream 206 and lower quench stream 205.

Stream 211 may bypass quench oil/water settlers QWS-201 and QWS-202 and be fed directly upstream of a filter and after stream 211 passes through the filter, it is designated as stream 212 and is sent to the downstream process water cleaning units to be cleaned and then sent to the downstream dilution steam generation unit. If small amounts of light oil is dissolved in stream 211, such light oil may be stripped in a downstream water stripper and returned to quench column QC-201.

Quench column bottoms stream 210 may be split into quench column bottoms stream 210A and quench column bottoms stream 210B. In embodiments of the invention, quench column bottoms stream 210 may be split so that the mass flow ratio quench column bottoms stream 210A/quench column bottoms stream 210B is in a range 40/60 to 60/40, preferably 50/50 or thereabout. Quench column bottoms stream 210A may be fed to quench oil/water settler QWS-201. QWS-201 separates quench column bottom stream 210A into entrained oil/tar, bottoms quench, and pygas. Pygas is designated as stream 213. The bottoms quench may be pumped back to quench column QC-201 as stream 207A, which forms a part of quench bottom stream 209. Quench column bottoms stream 210B may be fed to quench oil/water settler QWS-202. QWS-202 separates quench column bottom stream 210B into entrained oil/tar, bottoms quench, and pygas. Pygas is designated as stream 215. Streams 213 and 215 are mixed together and become stream 216, which may be sent to a downstream benzene unit. The bottoms quench may be pumped back to quench column QC-201 as stream 207B, which forms a part of quench bottom stream 209. In other words, stream 207A, 207B, and stream 208 are mixed, and the mixture enters the quench column QC-201 just below the quench column chimney tray as quench bottom stream 209. Tar may be drained from quench oil/water settler QWS-201 as stream 214 and from quench oil/water settler QWS-202 as stream 214A. Streams 214 and 214A combine to form stream 214C, which is sent to a tar disposal separator.

Figure 3:
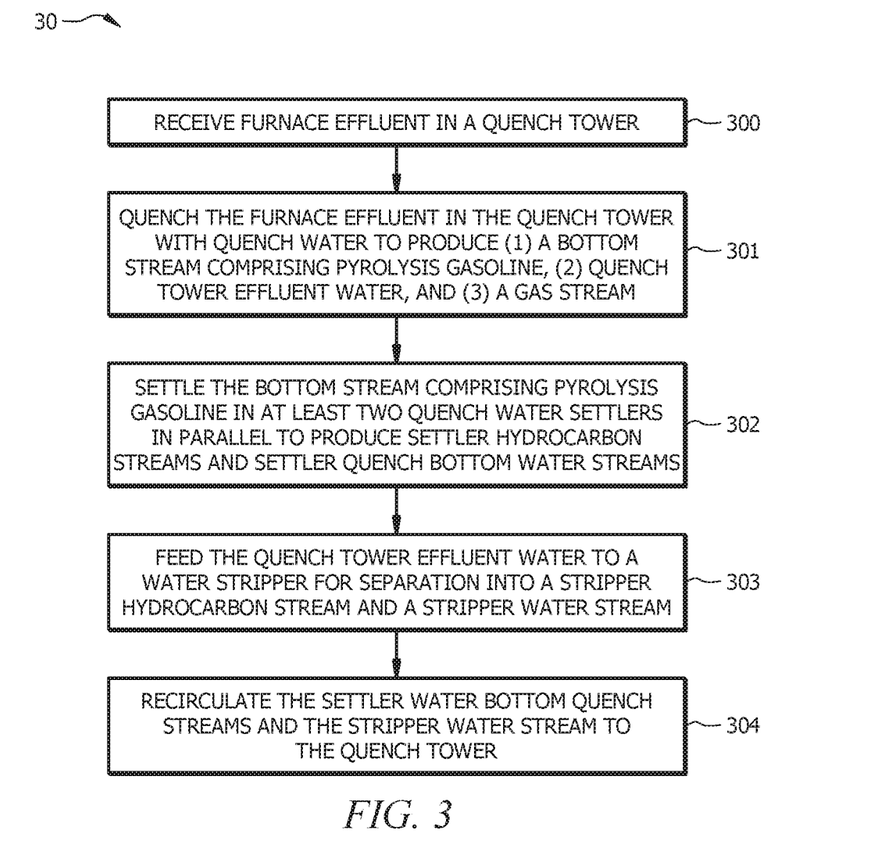
FIG. 3 shows a method of reducing fouling of equipment in a quench system, according to embodiments of the invention.

Referring to FIG. 3, and consistent with the foregoing system description, embodiments of the invention include method 30, which is a method of reducing fouling of equipment in a quench water recycling loop of a steam cracker quench system by separating tar from water in the quench water recycling loop. The method may include, at block 300, receiving furnace effluent in a quench tower. Block 301 of method 30 may include quenching the furnace effluent in the quench tower with quench water to produce (1) a bottom stream comprising pyrolysis gasoline, (2) quench tower effluent water, and (3) a gas stream. After the quenching of block 301, method 30 may include, at block 302, settling the bottom stream comprising pyrolysis gasoline in two or more quench water settlers in parallel to produce settler hydrocarbon streams (Pygas), settler quench bottom water streams, and tar streams. The quench water settlers may each be configured as quench oil/water settler 40 described below. Block 303 of method 30 may involve feeding the quench tower effluent water to a water stripper for separation into a stripper hydrocarbon stream and a stripper water stream. Then, at block 304, method 30 may include recirculating the settler water bottom quench streams and the stripper water stream to the quench tower.

In embodiments of the invention, quench oil/water settlers QWS-201 and QWS-202 may be so configured such that the residence time therein maximizes oil/water separation and thereby eliminate or at least minimize tar-like fouling material entrainment in quench bottom stream 209.

Figure 4:
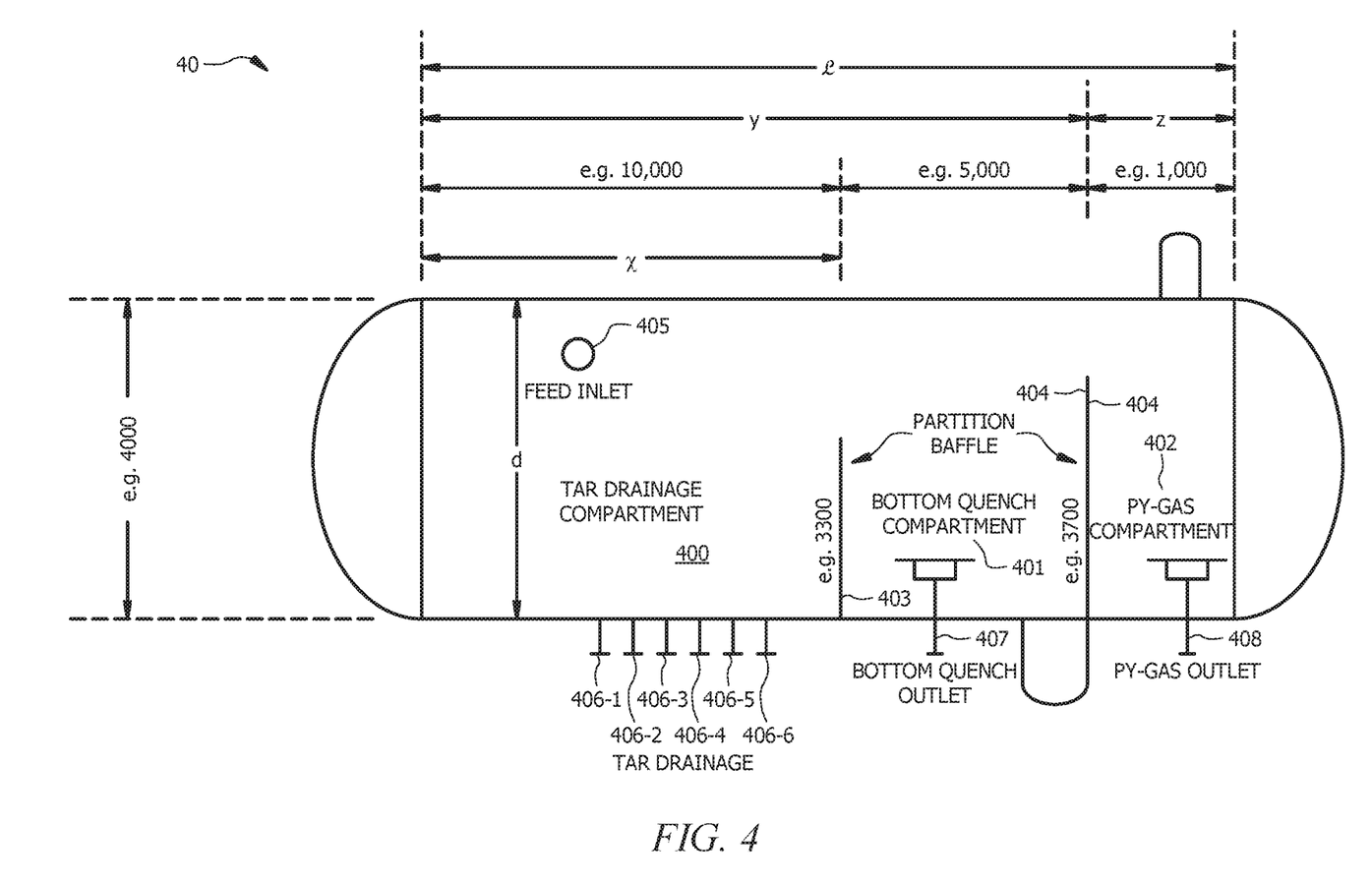
FIG. 4 shows a quench oil/water settler, according to embodiments of the invention.

FIG. 4 shows such a configuration in quench oil/water settler 40, according to embodiments of the invention. Quench oil/water settler 40 may be a horizontal capsule tank, as shown, although other shapes may be used in embodiments of the invention (e.g., a horizontal cylindrical tank). In embodiments of the invention where quench oil/water settler 40 comprises a horizontal capsule tank, corners of the horizontal capsule tank are where a cylindrical section meets the spherical section. It should be noted that, in FIG. 4, the values for lengths and heights can be in any unit as the values shown are examples of how the different lengths and heights relate to each other.

Quench oil/water settler 40 may include feed inlet 405 to receive, for example, streams 210A or 210B. Quench oil/water settler 40 may include tar drainage compartment 400, bottom quench compartment 401, and pyrolysis gas compartment 402. Tar drainage compartment baffle 403 and the vertical plane in which it is located may separate tar drainage compartment 400 from bottom quench compartment 401. Bottom quench middle compartment baffle 404 may be the separation point between quench compartment 401 and pyrolysis gas compartment 402. In embodiments of the invention, the length of quench oil/water settler 40 ("L")/the height of tar drainage compartment baffle 403 may be in the range 16/3.4 to 16/3.2, preferably 16/3.3 or thereabout. In embodiments of the invention, the ratio of internal diameter "d" of quench oil/water settler 40 to the height of drainage compartment baffle 403 is 4.0/3.4 to 4.0/3.2, preferably 4/3.3. Tar drainage compartment baffle 403 may be located at distance "x" from a corner of quench oil/water settler 40 that is closest to feed inlet nozzle 405. The ratio of the length of quench oil/water settler 40 ("L")/"x" may be 16.0/10.5 to 16.0/9.5, preferably 16/10, or thereabout.

Quench oil/water settler 40 may further include one or more nozzles 406-1 to 406-6 for draining tar from quench oil/water settler 40. Nozzles 406-1 to 406-6 may be located between the tar drainage compartment baffle and the corner of the settler that is closest to the feed inlet nozzle so that nozzles 406-1 to 406-6 can drain tar from tar drainage compartment 400.

Quench oil/water settler 40 may further include bottom quench middle compartment baffle 404 configured such that the ratio of the internal diameter ("d") of quench oil/water settler 40 to the height of bottom quench middle compartment baffle 404 may be 4.0/3.8 to 4.0/3.6, preferably 4.0/3.7 or thereabout. In embodiments of the invention, bottom quench middle compartment baffle 404 is located at distance "z" from a corner of the settler that is closest to a pyrolysis gas outlet nozzle. In embodiments of the invention, the ratio of the length of quench oil/water settler 40 ("L")/"z" is 16.0/1.2 to 16.0/0.8.

Quench oil/water settler 40 may further include outlet 407, for settler bottom quench water, located between the tar drainage compartment baffle 403 and the bottom quench middle compartment baffle 404. Quench oil/water settler 40 may also include pyrolysis outlet 408 for pyrolysis gas. Pyrolysis outlet 408 may be located between bottom quench middle compartment baffle 404 and the corner of quench oil/water settler 40 that is closest to pyrolysis outlet 408.

In embodiments of the invention, quench oil/water settlers QWS-201 and QWS-202 may have the configuration of quench oil/water settler 40. Although in FIG. 2 two quench oil/water settlers are shown, embodiments of the invention may utilize any number of the quench water settlers as described herein (e.g., 1, 2. 3, 4, 5, or more).

Referring to FIG. 2, in embodiments of the invention, the trays in quench column QC-201 may be configured to capture tar/fouling material. For example, one or more angle iron trays may be installed immediately above the bottom quench distributor in quench column QC-201. Such tray location may help to capture any tar/fouling material that may still be included in stream 209 and prevent such tar/fouling from getting into quench water circulation stream 204.

In embodiments of the invention, the operation of quench oil/water settler 40 results in material flowing through quench oil/water settler 30 having a residence time therein in the range of 20 to 30 minutes, and all ranges and values there between including values 20 min, 21 min, 22 min, 23 min, 24 min, 25 min, 26 min, 27 min, 28 min, 29 min, and 30 min. In embodiments of the invention, the tar composition in bottom quench stream 209 includes $C_9$ hydrocarbons and heavier ($C_{9+}$, e.g., $C_9$, $C_{10}$, $C_{11}$, $C_{12}$ etc. hydrocarbons). In embodiments of the invention, the tar composition in bottom quench tower effluent water (stream 203) includes $C_9$ hydrocarbons and heavier ($C_{9+}$, e.g., $C_9$, $C_{10}$, $C_{11}$, $C_{12}$ etc. hydrocarbons) In embodiments of the invention, the tar droplets have a diameter in the range of 80 to 100 μm, and all ranges and values there between including values 80 μm, 81 μm, 82 μm, 83 μm, 84 μm, 85 μm, 86 μm, 87 μm, 88 μm, 89 μm, 90 μm, 91 μm, 92 μm, 93 μm, 94 μm, 95 μm, 96 μm, 97 μm, 98 μm, 99 μm, and 100 μm.

Figure 5:
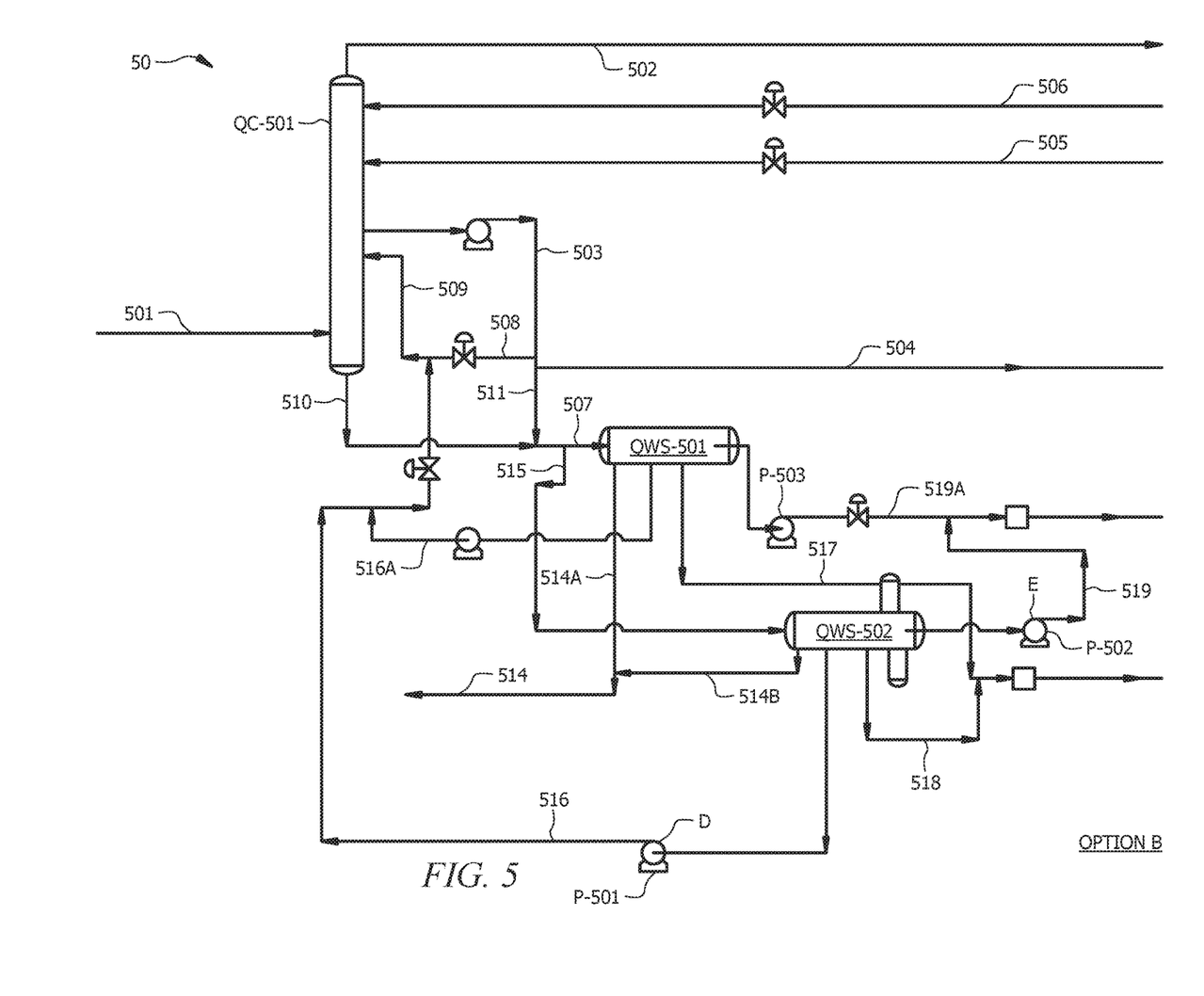
FIG. 5 shows a quench system designed to reduce fouling of equipment in the quench system, according to embodiments of the invention.

FIG. 5 shows quench system 50, according to embodiments of the invention. Furnace effluent 501 is fed at the bottom of quench column QC-501. In quench column QC-501, furnace effluent 501 is scrubbed with circulating water to quench it and stop additional thermal side reactions which would cause loss in selectivity to light olefin ($C_2$ to $C_4$ olefins, preferably ethylene and/or propylene) products. Raw gas stream 502, which may be saturated with water, leaves QC-501 at the top and may be fed to a cracked gas compressor (CGC), after which there may be further processing/separation in downstream units. Stream 503 may comprise hot water and may be withdrawn from the quench column chimney tray and split into various streams, namely quench water circulation stream 504, stream 508, and stream 511, as shown. Quench water circulation stream 504 may drive downstream heat exchangers by transferring its heat to these heat exchangers, and thus, in the heat transfer process, quench water circulation stream 504 is cooled. Quench water circulation stream 504 may be fed back to quench column QC-501 as two separate streams, upper quench stream 506 and lower quench stream 505.

Stream 511 may be mixed with quench column bottoms stream 510 to form a combined stream. The combined stream may be split into streams 507 and 515 so that the mass flow ratio stream 507/stream 515 is in the range 55/45 to 65/35, preferably 60/40, or thereabout. Stream 507 may be fed to quench oil/water settler QWS-501 and stream 515 may be fed to quench oil/water settler QWS-502. QWS-501 separates stream 507 into entrained oil/tar stream 514A, bottom quench stream 516A, pygas stream 519A, and process water stream 517. Process water stream 517 may be discharged upstream of a filter. QWS-502 separates stream 515 into entrained oil/tar stream 514B, bottom quench stream 516, pygas stream 519, and process water stream 518. Process water stream 518 may be discharged upstream of a filter. Pump P-501 may pump bottom quench stream 516 from QWS-502 to QC-501. Stream 508, 516A and 516 forms quench bottom stream 509. Pygas stream 519 and 519A may be pumped by P-502 and P503, respectively to downstream benzene processing unit. Tar stream 514 may be formed from discharge from streams 514A and 514B.

Figure 6:
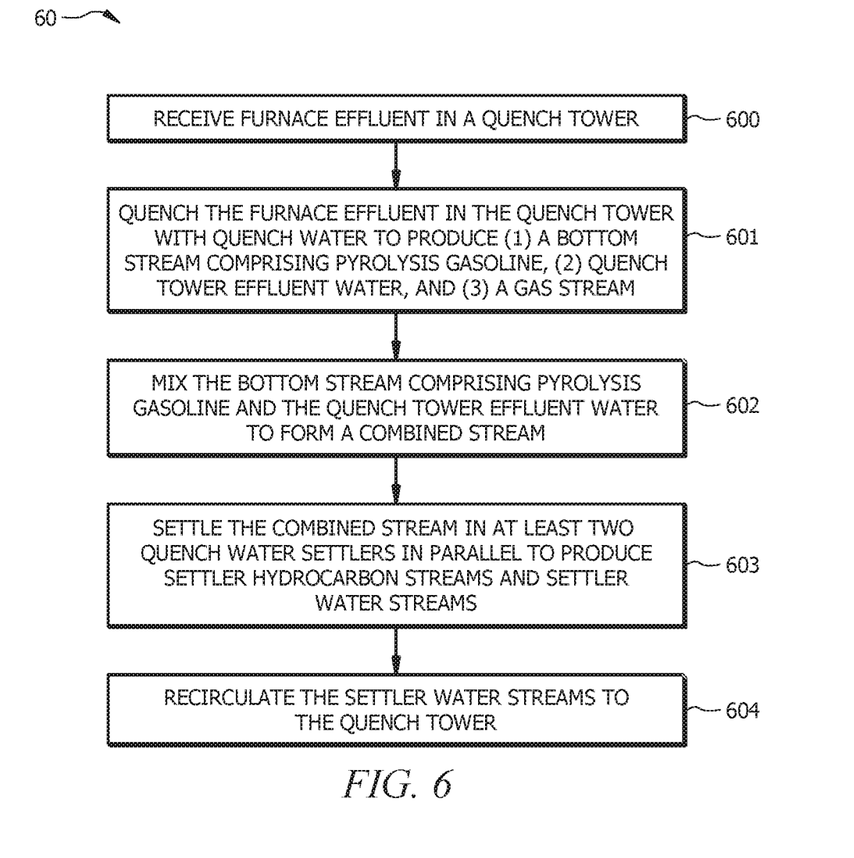
FIG. 6 shows a method of reducing fouling of equipment in a quench system, according to embodiments of the invention.

Referring to FIG. 6, and consistent with the foregoing system description, embodiments of the invention include method 60, which is a method of reducing fouling of equipment in a quench water recycling loop of a steam cracker quench system by separating tar from water in the quench water recycling loop. The method may include, at block 600, receiving furnace effluent in a quench tower. Block 601 of method 60 may include quenching the furnace effluent in the quench tower with quench water to produce (1) a bottom stream comprising pyrolysis gasoline, (2) quench tower effluent water, and (3) a gas stream. After the quenching of block 601, method 60 may include, at block 602, mixing the bottom stream comprising pyrolysis gasoline and the quench tower effluent water to form a combined stream. At block 603, method 60 involves settling the combined stream in two or more quench water settlers in parallel to produce settler hydrocarbon streams and settler water streams. The quench water settlers may each be configured as quench oil/water settler 70 described below. Block 604 of method 60 may involve recirculating the settler water streams to the quench tower.

In embodiments of the invention, quench oil/water settlers QWS-501 and QWS-502 may be so configured such that the residence time therein maximizes oil/water separation and thereby minimize/eliminate tar-like fouling material entrainment in quench bottom stream 509.

Figure 7:
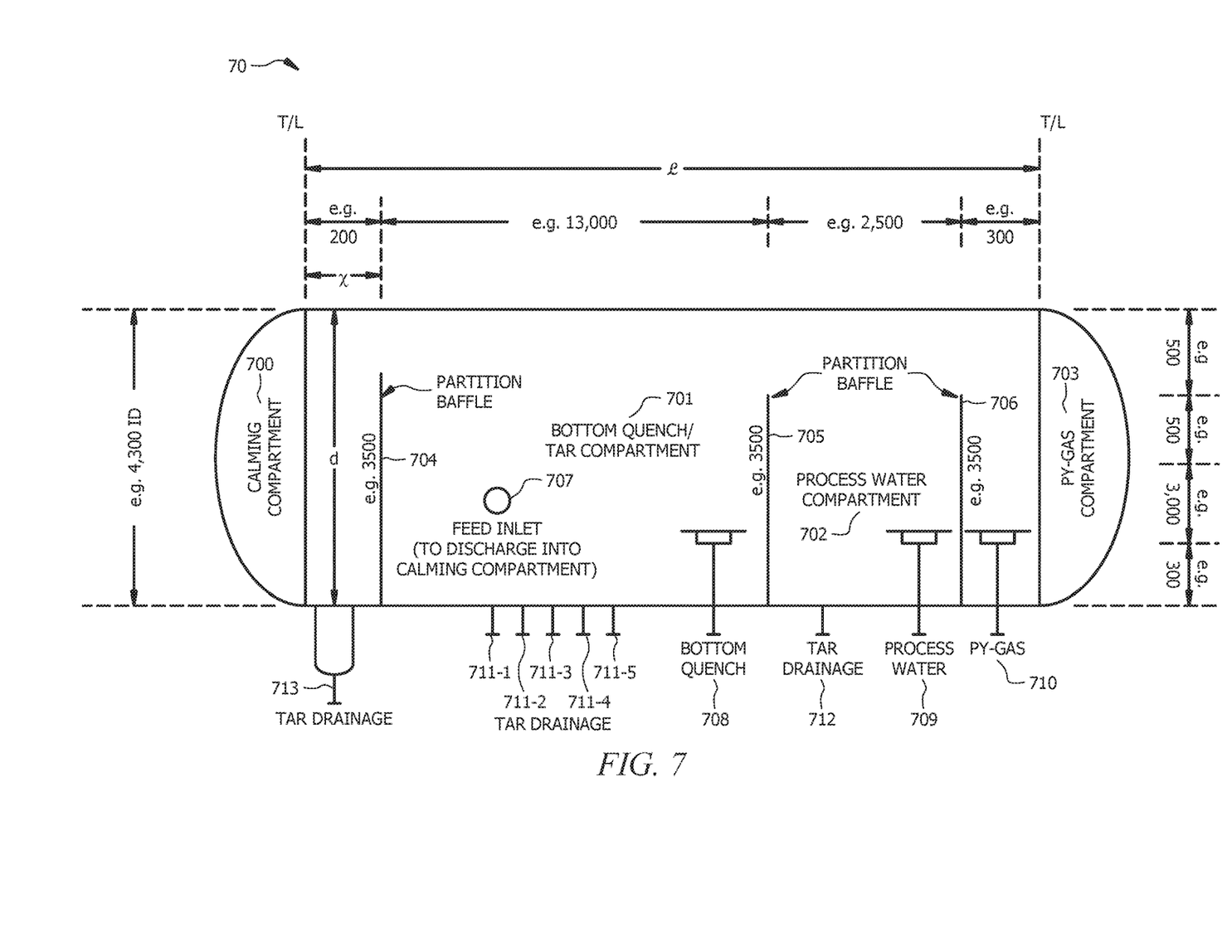
FIG. 7 shows a quench oil/water settler, according to embodiments of the invention.

FIG. 7 shows such a configuration in quench oil/water settler 70, according to embodiments of the invention. Quench oil/water settler 70 may be a horizontal capsule tank, as shown in FIG. 7, although other shapes may be used in embodiments of the invention (e.g., a horizontal cylindrical tank). In embodiments of the invention, where quench oil/water settler 70 comprises a horizontal capsule tank, corners of the horizontal capsule tank are where a cylindrical section meets the spherical section. It should be noted that, in FIG. 7, the values for lengths and heights can be in any unit as the values shown are examples of how the different lengths and heights relate to each other.

Quench oil/water settler 70 may include feed inlet 707 for receiving, for example, stream 514 or stream 515. Quench oil/water settler 70 may include calming compartment 700, bottom quench/tar compartment 701, process water compartment 702, and pyrolysis gas compartment 703. Partition baffle 704 and the vertical plane in which it is located may separate calming compartment 700 from bottom quench/tar compartment 701. Partition baffle 705 and the vertical plane in which it is located may separate bottom quench/tar compartment 701 and process water compartment 702. Partition baffle 706 and the vertical plane in which it is located may separate process water compartment 702 and pyrolysis gas compartment 703. In embodiments of the invention, the length of quench oil/water settler 70 ("l")/the height of 704, 705, or 706 may be in the range 16/4.0 to 16/3.6, preferably 16/3.8 or thereabout. In embodiments of the invention, the ratio of internal diameter "d" of quench oil/water settler 70 to the height of the partition baffles 704, 705, and 706 in the range 4.3/4.0 to 4.3/3.6. Partition baffle 704 may be located at distance "x" from a corner of quench oil/water settler 70 that is closest to feed inlet nozzle 705. The ratio of the length of quench oil/water settler 70 ("l")/"x" may be 16.0/0.3 to 16.0/0.1, preferably 16.0/0.2.

Quench oil/water settler 70 may further include one or more drainage outlets 711-1 to 711-5 leading from bottom quench/tar drainage compartment 701 for draining tar from quench oil/water settler 70. Quench oil/water settler 70 may further include bottom quench outlet 708, leading from the bottom quench/tar drainage compartment 701 for removing settler water.

Quench oil/water settler 70 may further include drainage outlet 713, leading from feed calming compartment 700 for draining tar. Quench oil/water settler 70 may further include drainage outlet 712 leading from process water compartment 702 for draining tar. Quench oil/water settler 70 may further include outlet 709 leading from process water compartment 702 for removing water.

Quench oil/water settler 70 may also include pyrolysis outlet 710 for removing pyrolysis gas from quench oil/water settler 70.

In embodiments of the invention, quench oil/water settlers QWS-501 and QWS-502 may have the configuration of quench oil/water settler 70. Although in FIG. 5 two quench oil/water settlers are shown, embodiments of the invention may utilize any number of the quench water settlers described herein (e.g., 1, 2. 3, 4, 5, or more).

In embodiments of the invention, the trays in quench column QC-501 may be configured to capture tar/fouling material. For example, one or more angle iron trays may be installed immediately above the bottom quench distributor in quench column QC-501. Such tray location may help to capture any tar/fouling material that may still be included in stream 509 and prevent such tar/fouling from getting into quench water circulation stream 504.

In embodiments of the invention, the operation of quench oil/water settler 70 results in material flowing through quench oil/water settler 70 having a residence time therein in the range of 20 to 30 minutes, and all ranges and values there between including values 20 min, 21 min, 22 min, 23 min, 24 min, 25 min, 26 min, 27 min, 28 min, 29 min, and 30 min. In embodiments of the invention, the tar composition in bottom quench stream 509 includes $C_9$ hydrocarbons and heavier ($C_{9+}$, e.g., $C_9$, $C_{10}$, $C_{11}$, $C_{12}$ etc. hydrocarbons). In embodiments of the invention, the tar composition in bottom quench tower effluent water (stream 503) includes $C_9$ hydrocarbons and heavier ($C_{9+}$, e.g., $C_9$, $C_{10}$, $C_{11}$, $C_{12}$ etc. hydrocarbons). In embodiments of the invention, the tar droplets have a diameter in the range of 80 to 100 μm, and all ranges and values there between including values 80 μm, 81 μm, 82 μm, 83 μm, 84 μm, 85 μm, 86 μm, 87 μm, 88 μm, 89 μm, 90 μm, 91 μm, 92 μm, 93 μm, 94 μm, 95 μm, 96 μm, 97 μm, 98 μm, 99 μm, and 100μ.

The invention claimed is:

1. A method of reducing fouling of equipment in a quench water recycling loop of a steam cracker quench system by separating tar from water in the quench water recycling loop, the method comprising:
   receiving furnace effluent in a quench tower;
   quenching the furnace effluent in the quench tower with quench water to produce (1) a bottom stream comprising pyrolysis gasoline, (2) quench tower effluent water, and (3) a gas stream;
   settling the bottom stream comprising pyrolysis gasoline in at least two quench water settlers in parallel, each of the quench water settlers producing a settler hydrocarbon stream and a settler bottom quench water stream; and
   feeding the quench tower effluent water to a water stripper for separation into a stripper hydrocarbon stream, a stripper water stream, and a tar/oil stream; and
   recirculating the settler bottom quench water streams and the stripper water stream to the quench tower.

2. The method of claim 1, wherein the at least two quench water settlers each comprise:
   a tar drainage compartment baffle, the ratio of an internal diameter of the settler to the height of the tar drainage compartment baffle is 4.0/3.4 to 4.0/3.2;
   one or more outlets, for draining tar, located between the tar drainage compartment baffle and a corner of the settler that is closest to a feed inlet nozzle;
   a bottom quench middle compartment baffle, the ratio of the internal diameter of the settler to the height of the bottom quench middle compartment baffle is 4.0/3.8 to 4.0/3.6;
   an outlet, for removing settler water, located between the tar drainage compartment baffle and the bottom quench middle compartment baffle; and
   an outlet, for removing pyrolysis gas, located between the bottom quench middle compartment baffle and a corner of the respective quench water settler located closest to the outlet for pyrolysis gas.

3. The method of claim 2, wherein the tar drainage compartment baffle is located at distance "x" from the corner of the respective quench water settler that is closest to a feed inlet nozzle, wherein ratio of the length of the respective quench water settler to "x" is 16.0/10.5 to 16.0/9.5.

4. The method of claim 2, wherein the bottom quench middle compartment baffle is located at distance "z" from the corner of the respective quench water settler that is closest to a pyrolysis gas outlet nozzle, wherein ratio of the length of the quench water settler to "z" is 16.0/1.2 to 16.0/0.8.

5. The method of claim 1, wherein the at least two quench settlers comprise a horizontal cylindrical tank.

6. The method of claim 1, wherein the settling the bottom stream comprises splitting the bottom stream into a first stream and a second stream such that mass flow of first stream/mass flow of second stream is in the range of 40/60 to 60/40.

7. The method of any of claim 1, further comprising the step of:
capturing tar material by a tray located immediately above a bottom quench distributor in the quench tower.

8. The method of claim 1, wherein a residence time of material in the at least two settlers is in the range of 20 to 30 minutes.

9. The method of claim 1, wherein the settler bottom quench water comprises tar that comprises $C_9$ hydrocarbons and heavier and the quench tower effluent water comprises tar that comprises $C_9$ hydrocarbons and heavier.

10. The method of claim 1, wherein the at least two quench water settlers comprise a horizontal capsule tank and corners of the horizontal capsule tank are where a cylindrical section meets a spherical section.

11. A method of reducing fouling of equipment in a quench water recycling loop of a steam cracker quench system by separating tar from water in the quench water recycling loop, the method comprising:
receiving furnace effluent in a quench tower; quenching the furnace effluent in the quench tower with quench water to produce (1) a bottom stream comprising pyrolysis gasoline, (2) quench tower effluent water, and (3) a gas stream;
mixing the bottom stream comprising pyrolysis gasoline and the quench tower effluent water to form a combined stream; settling the combined stream in at least two quench water settlers in parallel to produce settler hydrocarbon streams, settler bottom quench water streams, settler process water streams, and tar/oil streams; and
recirculating the settler bottom quench water streams to the quench tower;
wherein the at least two quench water settlers comprises: three partition baffles disposed in the settler so that the settler comprises four compartments, the ratio of the internal diameter of the settler to the height of each of the three partition baffles being 4.3/4.0 to 4.3/3.6.

12. The method of claim 11, wherein the at least two quench water settlers comprises: three partition baffles disposed in the settler so that the settler comprises four compartments, the ratio of the internal diameter of the settler to the height of each of the three partition baffles being 4.3/4.0.

13. The method of claim 11, wherein the four compartments being a feed calming compartment, a bottom quench/tar drainage compartment, a process water compartment, and a pyrolysis gas compartment, wherein the at least two quench water settlers further comprise:
a plurality of drainage outlets leading from the bottom quench/tar drainage compartment for draining tar;
a bottom quench outlet leading from the bottom quench/tar drainage compartment for removing settler water;
a drainage outlet leading from the feed calming compartment for draining tar;
a drainage outlet leading from the process water compartment for draining tar;
an outlet leading from the process water compartment for removing settler water;
an outlet leading from the pyrolysis gas compartment for removing pyrolysis gas.

14. The method of claim 11, wherein the at least two quench settlers comprise a horizontal cylindrical tank.

15. The method of claim 11, wherein the settling the combined stream comprises splitting the combined stream in a first stream and a second stream such that mass flow of first stream/mass flow of second stream is in the range of 40/60 to 60/40.

16. The method of claim 11, further comprising:
capturing tar material by a tray located immediately above a bottom quench distributor in the quench tower.

17. The method of claim 11, wherein a residence time of material in the at least two settlers is in the range of 20 to 30 minutes.

18. The method of claim 11, wherein the settler bottom quench water comprises tar that comprises C9 hydrocarbons and heavier and the quench tower effluent water comprises tar that comprises C9 hydrocarbons and heavier.

19. A method of reducing fouling of equipment in a quench water recycling loop of a steam cracker quench system by separating tar from water in the quench water recycling loop, the method comprising:
receiving furnace effluent in a quench tower;
quenching the furnace effluent in the quench tower with quench water to produce (1) a bottom stream comprising pyrolysis gasoline, (2) quench tower effluent water, and (3) a gas stream;
mixing the bottom stream comprising pyrolysis gasoline and the quench tower effluent water to form a combined stream;
settling the combined stream in at least two quench water settlers in parallel to produce settler hydrocarbon streams, settler bottom quench water streams, settler process water streams, and tar/oil streams, the at least two quench water settlers each comprising:
three partition baffles disposed in the settler so that the settler comprises four compartments, the ratio of the internal diameter of the settler to the height of each of the three partition baffles being 4.3/4.0 to 4.3/3.6; and
recirculating the settler bottom quench water streams to the quench tower;
wherein the settler bottom quench water comprises tar that comprises $C10^+$ hydrocarbons.

20. The method of claim 19, wherein the four compartments comprise a feed calming compartment, a bottom quench/tar drainage compartment, a process water compartment, and a pyrolysis gas compartment, and the at least two quench water settlers each further comprising:
a plurality of drainage outlets leading from the bottom quench/tar drainage compartment for draining tar;
a bottom quench outlet leading from the bottom quench/tar drainage compartment for removing settler water;
a drainage outlet leading from the feed calming compartment for draining tar;
a drainage outlet leading from the process water compartment for draining tar;
an outlet leading from the process water compartment for removing settler water;
an outlet leading from the pyrolysis gas compartment for removing pyrolysis gas; and
recirculating the settler water streams to the quench tower.

* * * * *

UNITED STATES PATENT AND TRADEMARK OFFICE
CERTIFICATE OF CORRECTION

PATENT NO. : 11,319,494 B2
APPLICATION NO. : 16/462749
DATED : May 3, 2022
INVENTOR(S) : Mustapha Karime et al.

It is certified that error appears in the above-identified patent and that said Letters Patent is hereby corrected as shown below:

In the Claims

Column 13, Claim 7, Line 4, delete "method of any of claim 1" and replace with --method of claim 1--.

Signed and Sealed this
Twenty-third Day of August, 2022

Katherine Kelly Vidal
*Director of the United States Patent and Trademark Office*